United States Patent [19]

Hinze

[11] 4,070,304
[45] Jan. 24, 1978

[54] ANTIOXIDANT COMPOSITION, STABILIZED POLYOLS AND POLYURETHANES PREPARED THEREFROM

[75] Inventor: Kenneth J. Hinze, Lake Jackson, Tex.

[73] Assignee: The Dow Chemical Company, Midland, Mich.

[21] Appl. No.: 715,807

[22] Filed: Aug. 19, 1976

Related U.S. Application Data

[62] Division of Ser. No. 552,095, Feb. 24, 1975, Pat. No. 4,007,230.

[51] Int. Cl.$^2$ .............................................. C09K 15/08
[52] U.S. Cl. .................................... 252/404; 252/403
[58] Field of Search ............................... 252/403, 404; 260/611.5, 2.5 A, 45.95 G, 77.5 SS; 536/120

[56] References Cited

U.S. PATENT DOCUMENTS

| 2,736,709 | 2/1956 | Glickman et al. | 252/611.5 |
| 2,942,033 | 6/1960 | Leis et al. | 260/611.5 |
| 3,325,547 | 6/1967 | Cour et al. | 260/611.5 |
| 3,388,169 | 6/1968 | Hyre et al. | 260/611.5 |
| 3,637,865 | 1/1972 | Haring | 260/611.5 |

*Primary Examiner*—Benjamin R. Padgett
*Assistant Examiner*—Josephine Lloyd
*Attorney, Agent, or Firm*—J. G. Carter

[57] ABSTRACT

Synergistic antioxidant compositions consisting of certain hindered phenols such as 2,4-dimethyl-6-octyl phenol and 4,4'-bis ($\alpha,\alpha$-dimethylbenzyl) diphenyl amine are useful to stabilize polyether polyols against oxidative degradation and prevent scorch in polyurethane foams prepared from the polyether polyols.

3 Claims, No Drawings

ANTIOXIDANT COMPOSITION, STABILIZED POLYOLS AND POLYURETHANES PREPARED THEREFROM

CROSS-REFERENCE TO RELATED APPLICATIONS

This is a divisional of application Ser. No. 552,095, filed Feb. 24, 1975 now U.S. Pat. No. 4,007,230.

The present invention concerns antioxidant compositions, polyether polyols containing such compositions and polyurethane foams prepared therefrom.

Antioxidants for polyurethanes are well known and include hindered phenols, phenothiazines, mixtures of hindered phenols with phenothiazines or phosphoric acid and mixtures of 2,6-ditertiary-butyl-4-methyl phenol and a dialkyl diphenyl amine such as is disclosed in U.S. Pat. No. 3,567,664.

It has now been unexpectedly discovered that a synergistic antioxidant composition containing 1. from about 15 to about 85 and preferably from about 25 to about 75 percent by weight of a sterically hindered phenolic antioxidant and
2. from about 85 to about 15 and preferably from about 75 to about 25 percent by weight of 4,4'-bis (α,α-dimethylbenzyl) diphenyl amine is effective in stabilizing polyether polyols against oxidative degradation and that polyurethane foams prepared therefrom do not scorch internally.

Suitable sterically hindered phenolic antioxidant compounds which can be employed herein include, for example, 2,4-dimethyl-6-octyl phenol,
2,6-ditertiarybutyl-4-methyl phenol,
2,6-ditertiarybutyl-4-ethyl phenol,
2,6-ditertiarybutyl-4-n-butyl phenol,
2,2'-methylenebis (4-methyl-6-tertiarybutyl phenol),
2,2'-methylenebis (4-ethyl-6-tertiarybutyl-phenol),
2,4-dimethyl-6-tertiarybutyl phenol,
4-hydroxymethyl-2,6-ditertiarybutyl phenol,
n-octadecyl-beta (3,5-ditertiarybutyl-4-hydroxyphenyl) propionate, mixtures thereof and the like.

The polyether polyols which can be stabilized with the antioxidant composition of the present invention include those having from 2 to about 8 OH groups. Such polyols are disclosed by and methods for their preparation are given in POLYURETHANES: CHEMISTRY AND TECHNOLOGY II. TECHNOLOGY by Saunders and Frisch, Interscience Publishers, 1964. Also described therein are polyurethane foams and methods for their preparation.

Particularly suitable polyether polyols include those prepared by reacting an initiator compound having 2 to about 8 hydroxyl groups with an alkylene oxide or mixtures of such oxides, said polyols having molecular weights of from about 250 to about 10,000, preferably from about 2000 to about 8,000.

Suitable initiator compounds include, for example, ethylene glycol, propylene glycol, water, butane diol, hexane diol, glycerine, trimethylol propane, hexane triol, penaerythritol, sucrose, mixtures thereof and the like.

Suitable alkylene oxides include, for example, 1,2-propylene oxide, ethylene oxide, 1,2-butylene oxide, 2,3-butylene oxide, styrene oxide, epichlorohydrin, epibromohydrin, mixtures thereof and the like.

The antioxidant compositions are employed in quantities of at least 10 parts per million (ppm) based upon the polyol, preferably from 500 to about 10,000 ppm and most preferably from about 1500 to about 5000.

The following examples are illustrative of the present invention.

EXAMPLE 1

Various antioxidants were employed to stabilize a polyether polyol against oxidative degradation. The polyol employed was the reaction product of a mixture of 92 wt. percent propylene oxide and 8 wt. percent ethylene oxide with a glycerine-propylene oxide reaction product having a molecular weight of about 450, the resultant polyol having a molecular weight of about 3000.

The stability was determined by placing the samples in a DuPont differential scanning calorimeter, Model 990 Thermal Analyzer and Module at the indicated temperature and the induction period (time to initiation of oxidative decomposition) was recorded.

In the stability determination, the samples weighing 10 mg ± 0.2 mg were placed in an aluminum pan containing a disc of 100 mesh stainless steel wire screen in the bottom of the pan. The aluminum pan containing the sample to be tested was placed in the differential scanning calorimeter cell along with a reference pan containing only the wire screen. The differential scanning calorimeter cell was purged with nitrogen for five minutes after the sample and reference pans were placed in the cell. The cell was brought up to the isothermal temperature as quickly as possible without overshooting the desired temperature, usually 3 to 4 minutes. When the desired temperature was reached, the nitrogen was turned off and oxygen was introduced into the cell. When the oxygen flow rate reached 25 cc/minute, the time-base recorder was started. Time was recorded on the X axis of the recorder, the temperature profile of the run was recorded on the Y axis of the recorder, and the energy emitted or absorbed by the sample was recorded on the Y' axis. The induction period (time between introduction of oxygen into the cell and the time of initiation of oxidative decomposition) was determined by locating the point of interception of the base line (X axis) and the slope of the exotherm deflection (Y' axis). The longer the induction period of the sample, the more stable was the sample.

The stabilizers employed are designated as follows:
Phenolic Antioxidant A was 2,4-dimethyl-6-ocytyl-phenol
Phenolic Antioxidant B was 2,6-ditertiarybutyl-4-methyl-phenol
Phenolic Antioxidant C was 2,6-ditertiarybutyl-4-ethyl-phenol
Phenolic Antioxidant D was 2,6-ditertiarybutyl-4-n-butyl-phenol
Phenolic Antioxidant E was 2,2'-methylenebis-(4-methyl-6-tertiarybutyl-phenol)
Phenolic Antioxidant F was 2,2'-methylenebis-(4-ethyl-6-tertiarybutyl-phenol)

TABLE I

| Sample Number | Phenolic Antioxidant Type/Quantity ppm | 4,4'-bis (α,α-dimethylbenzyl) diphenylamine ppm | Induction period at 170° C, min. |
|---|---|---|---|
| 1[a] | A/3000 | — | 9.8 |
| 2[a] | — | 3000 | 9.8 |
| 3[b] | A/2250 | 750 | 14.8 |
| 4[b] | A/1500 | 1500 | 18.2 |
| 5[b] | A/ 750 | 2250 | 17.6 |
| 6[a] | B/3000 | — | 7.9 |
| 7[b] | B/2000 | 1000 | 17.2 |
| 8[a] | C/3000 | — | 8.4 |
| 9[b] | C/1500 | 1500 | 18.2 |
| 10[a] | D/3000 | — | 8.0 |
| 11[b] | D/1500 | 1500 | 17.2 |
| 12[a] | — | 2000 | 8.4 |
| 13[a] | E/2000 | — | 11.0 |
| 14[b] | E/1000 | 1000 | 18.4 |
| 15[a] | F/3000 | — | 8.3 |
| 16[b] | F/1500 | 1500 | 20.9 |

[a]These samples are comparative experiments
[b]These samples are examples of the present invention

EXAMPLE 2

The susceptibility to scorch of a polyurethane foam prepared from a polyol stabilized according to the present invention was determined on 3 foams having the following composition.

| Foam A | Foam B | Foam C | |
|---|---|---|---|
| 100 | 100 | 100 | parts by weight of the polyol employed in Example 1 containing 2000 ppm of 2,6-ditertiarybutyl-4-methyl-phenol and 1000 ppm of 4,4'-bis(α,α-dimethyl-benzyl)diphenyl amine. |
| 1.0 | 1.0 | 1.0 | parts by weight of a silicone oil cell control agent. |
| 0.200 | 0.225 | 0.250 | part by weight of stannous octoate (T-9 catalyst) |
| 0.1 | 0.1 | 0.1 | parts by weight of bis(2-dimethylaminoethyl) ether |
| 4.5 | 4.5 | 4.5 | parts by weight of water |
| 60.1 | 60.1 | 60.1 | parts by weight of an 80/20 mixture of 2,4-/2,6-toluene diisocyanate. |

A foam bun, which measured approximately 7 feet in length 42 inches in width and 24 inches in height, was prepared at each of the three T-9 catalyst levels. The three foam buns were stacked with the 0.200 parts T-9 bun on the bottom and the 0.250 parts T-9 bun on the top.

A one-inch cross-section slice was cut out of the center of the 0.225 parts T-9 foam bun. This slice of foam was observed over a fluorescent light for discoloration. There was no sign of discoloration with this antioxidant system.

The physical properties of these foams are as indicated in the following Table II.

TABLE II

| Property | | A | B | C |
|---|---|---|---|---|
| Density, | lbs/ft³ | 1.3 | 1.3 | 1.28 |
| | g/cc | 0.02083 | 0.02083 | 0.02051 |
| Tensile, | psi | 17.3 | 17.2 | 19.2 |
| | kg/cm² | 1.22 | 1.21 | 1.35 |
| Elongation, % | | 161 | 159 | 177 |
| Tear Resistance, | lb/in | 2.2 | 2.3 | 2.4 |
| | kg/cm | 0.39 | 0.41 | 0.43 |
| Resiliency, % | | 47 | 46 | 44 |
| 90% Comparison Set, % | | 4.9 | 5.3 | 5.2 |
| 4" ILD 25% | | 41 | 43 | 43 |
| 65% | | 77 | 81 | 79 |
| Modulus | | 1.75 | 1.88 | 1.84 |

I claim:
1. An antioxidant composition containing:
   A. from about 15 to about 85 percent by weight of a sterically hindered phenolic antioxidant selected from the group consisting of
      2,4-dimethyl-6-octyl phenol,
      2,6-ditertiarybutyl-4-methyl phenol,
      2,6-ditertiarybutyl-4-ethyl phenol,
      2,6-ditertiarybutyl-4-n-butyl phenol,
      2,2'-methylenebis (4-methyl-6-tertiarybutyl phenol),
      2,2'-methylenebis (4-ethyl-6-tertiarybutyl phenol),
      2,4-dimethyl-6-tertiarybutyl phenol,
      4-hydroxymethyl-2,6-ditertiarybutyl phenol,
      n-octadecyl-beta (3,5-dibetriarybutyl-4-hydroxyphenyl)propionate, and mixtures thereof; and
   B. from 85 to about 15 percent by weight of 4,4'-bis-(α,α-dimethylbenzyl) diphenyl amine.

2. The composition of claim 1 wherein component (A) is present in quantities of from about 25 to about 75 percent by weight and component (B) is present in quantities of from about 75 to about 25 percent by weight.

3. The composition of claim 2 wherein component (A) is selected from the group consisting of
   2,4-dimethyl-6-octyl phenol,
   2,6-ditertiarybutyl-4-methyl phenol,
   2,6-ditertiarybutyl-4-ethyl phenol,
   2,6-ditertiarybutyl-4-n-butyl phenol,
   2,2'-methylenebis (4-methyl-6-tertiarybutyl phenol),
   2,2'-methylenbis (4-ethyl-6-tertiarybutyl phenol), and mixtures thereof.

* * * * *